(12) United States Patent
Shimomura et al.

(10) Patent No.: US 9,988,541 B2
(45) Date of Patent: Jun. 5, 2018

(54) AQUEOUS INK, INK CARTRIDGE AND INK JET RECORDING METHOD

(71) Applicant: CANON KABUSHIKI KAISHA, Tokyo (JP)

(72) Inventors: Naofumi Shimomura, Kawasaki (JP); Takayuki Horiuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/490,005

(22) Filed: Apr. 18, 2017

(65) Prior Publication Data

US 2017/0335122 A1 Nov. 23, 2017

(30) Foreign Application Priority Data

May 18, 2016 (JP) ................................. 2016-099647

(51) Int. Cl.
*B41J 2/175* (2006.01)
*C09D 11/36* (2014.01)
*C09D 11/30* (2014.01)
*C09D 11/107* (2014.01)
*C09D 133/12* (2006.01)
(Continued)

(52) U.S. Cl.
CPC .............. *C09D 11/107* (2013.01); *B41J 2/01* (2013.01); *B41J 2/11* (2013.01); *B41J 2/1752* (2013.01);
(Continued)

(58) Field of Classification Search
CPC ........ B41J 2/17503; B41J 2/1752; B41J 2/01; B41J 2/11; C09D 11/106; C09D 11/107;
(Continued)

(56) References Cited

U.S. PATENT DOCUMENTS 8,590,999 B2 * 11/2013 Irita ..................... C09D 11/101
347/21
8,845,085 B2 * 9/2014 Kobayashi ............. C09D 11/30
347/100
(Continued)

FOREIGN PATENT DOCUMENTS

EP 2423274 A1 2/2012
EP 2924081 A1 9/2015
(Continued)

OTHER PUBLICATIONS

Sep. 20, 2017 European Search Report in European Patent Appln. No. 17000731.4.

*Primary Examiner* — Anh T. N. Vo
(74) *Attorney, Agent, or Firm* — Fitzpatrick, Cella, Harper & Scinto

(57) ABSTRACT

An aqueous ink for ink jet including a resin particle. The resin particle has a first layer and a second layer in this order from the inside toward the outside of the resin particle. The first layer is formed of a first resin in which the proportion of a unit derived from a cycloaliphatic-group-containing ethylenically unsaturated monomer is 10% by mass or less. The tetrahydrofuran-insoluble fraction of the second layer is 15% by mass or more. The second layer is formed of a second resin having the unit derived from the cycloaliphatic-group-containing ethylenically unsaturated monomer and a unit derived from an ionic-group-containing ethylenically unsaturated monomer. The proportion of the unit derived from the ionic-group-containing ethylenically unsaturated monomer in the second resin is 3% by mass or more to 70% by mass or less.

13 Claims, 2 Drawing Sheets

(51) Int. Cl.
   *C09D 11/106* (2014.01)
   *B41J 2/01* (2006.01)
   *C09D 133/22* (2006.01)
   *B41J 2/11* (2006.01)
   *C09D 133/10* (2006.01)
   *C09D 11/322* (2014.01)

(52) U.S. Cl.
   CPC ......... *B41J 2/17503* (2013.01); *C09D 11/106* (2013.01); *C09D 11/30* (2013.01); *C09D 11/322* (2013.01); *C09D 11/36* (2013.01); *C09D 133/10* (2013.01); *C09D 133/12* (2013.01); *C09D 133/22* (2013.01)

(58) Field of Classification Search
   CPC ....... C09D 11/30; C09D 11/322; C09D 11/36; C09D 133/10; C09D 133/12; C09D 133/22
   See application file for complete search history.

(56) References Cited

U.S. PATENT DOCUMENTS

| | | | |
|---|---|---|---|
| 9,039,130 | B2 | 5/2015 | Yatake |
| 9,255,207 | B2* | 2/2016 | Berge .................. C09D 11/30 |
| 2011/0001775 | A1* | 1/2011 | Nishiwaki ........... C09D 11/324 347/9 |
| 2014/0362136 | A1 | 12/2014 | Yatake |
| 2015/0275008 | A1* | 10/2015 | Shimomura ........... B41J 2/1752 347/20 |
| 2016/0340530 | A1 | 11/2016 | Horiuchi et al. |

FOREIGN PATENT DOCUMENTS

| | | |
|---|---|---|
| JP | 2011-012171 A | 1/2011 |
| JP | 2012-201692 A | 10/2012 |
| JP | 2014-101492 A | 6/2014 |
| JP | 2014-208738 A | 11/2014 |

* cited by examiner

US 9,988,541 B2

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

In recent years, an ink jet recording apparatus has an increasing opportunity to be used in a commercial printing field and an office printing field in association with the improvements of image quality and recording speed. As for the performance required of an ink used in such a field, there is mentioned the ability to record an image having good fixability and abrasion resistance. In order to improve these performance properties, an ink containing a resin particle having a core-shell structure is investigated (see Japanese Patent Application Laid-Open Nos. 2012-201692, 2014-101492 and 2014-208738).

Under the circumstances that the application fields of the ink jet recording apparatus are extended to the commercial printing field and the office printing field, the level required of the fixability and abrasion resistance is raised. As a result of an investigation by the present inventors, it is desired to develop an ink with the fixability and abrasion resistance more improved than the inks described in Japanese Patent Application Laid-Open Nos. 2012-201692, 2014-101492 and 2014-208738.

Accordingly, it is an object of the present invention to provide an aqueous ink capable of recording an image having excellent fixability and abrasion resistance. In addition, another object of the present invention is to provide an ink cartridge and an ink jet recording method using the aqueous ink.

SUMMARY OF THE INVENTION

The above objects are achieved by the following present invention. In other words, the aqueous ink according to the present invention is an aqueous ink for ink jet containing a resin particle, wherein the resin particle has a first layer and a second layer in this order from the inside toward the outside of the resin particle, the first layer is formed of a first resin in which a proportion of a unit derived from a cycloaliphatic-group-containing ethylenically unsaturated monomer is 10% by mass or less, (i) a tetrahydrofuran-insoluble fraction of the second layer is 15% by mass or more, (ii) the second layer is formed of a second resin having the unit derived from the cycloaliphatic-group-containing ethylenically unsaturated monomer and a unit derived from an ionic-group-containing ethylenically unsaturated monomer, and (iii) a proportion of the unit derived from the ionic-group-containing ethylenically unsaturated monomer in the second resin is 3% by mass or more to 70% by mass or less.

The ink cartridge according to the present invention is an ink cartridge having an ink and an ink storage portion storing the ink, wherein the ink is the aqueous ink according to the present invention.

The ink jet recording method according to the present invention is an ink jet recording method including ejecting an ink from an ink jet recording head to record an image on a recording medium, wherein the ink is the aqueous ink according to the present invention.

According to the present invention, there can be provided an aqueous ink capable of recording an image having excellent fixability and abrasion resistance. In addition, according to the present invention, there can be provided an ink cartridge and an ink jet recording method using the aqueous ink.

Further features of the present invention will become apparent from the following description of exemplary embodiments with reference to the attached drawings.

BRIEF DESCRIPTION OF THE DRAWINGS

FIGS. 2A and 2B schematically illustrate an exemplary ink jet recording apparatus for use in an ink jet recording method according to the present invention, in which FIG. 2A is a perspective view illustrating a principal part of the ink jet recording apparatus, and FIG. 2B is a perspective view illustrating a head cartridge.

DESCRIPTION OF THE EMBODIMENTS

Figure 1:
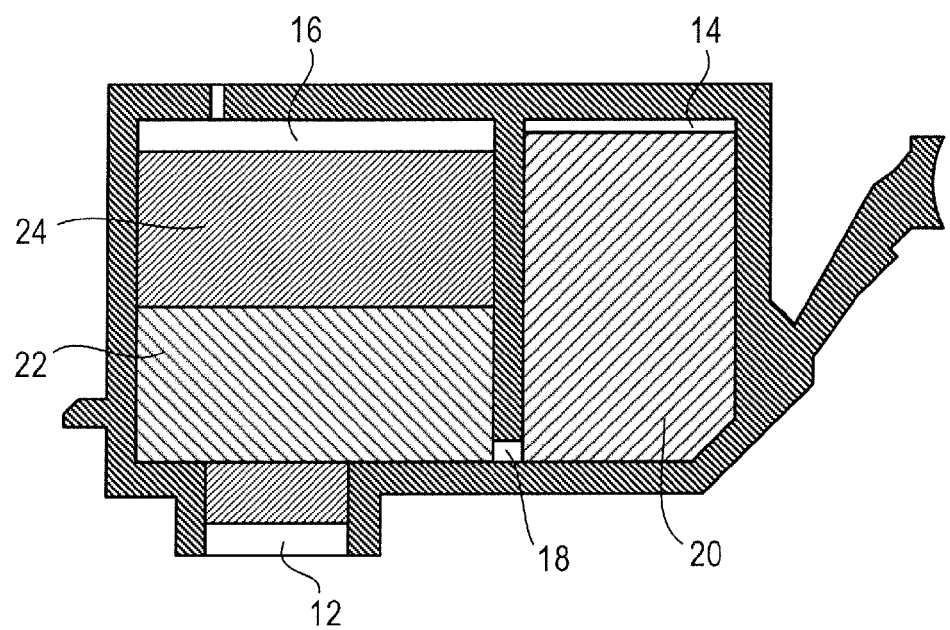
FIG. 1 is a sectional view schematically illustrating an ink cartridge according to an embodiment of the present invention.

Preferred embodiments of the present invention will now be described in detail in accordance with the accompanying drawings.

Embodiments of the present invention will hereinafter be described. However, the present invention is not limited to the following embodiments. An ionic group of a salt form may be present in the ink in a state of being dissociated into an ion. However, such a group is represented as "ionic group" for convenience's sake in the present invention. In addition, an aqueous ink for ink jet may be described simply as "ink". Further, tetrahydrofuran may be abbreviated and described as "THF". Various physical property values in the present specification are values at ordinary temperature (25° C.) unless expressly noted.

The present inventors have carried out an investigation about the inks containing respective resin particles which are described in Japanese Patent Application Laid-Open Nos. 2012-201692, 2014-101492 and 2014-208738. In the resin particle described in Japanese Patent Application Laid-Open No. 2012-201692, the proportion of a unit derived from an ionic-group-containing ethylenically unsaturated monomer in a resin forming a shell layer is at most 1% by mass. In addition, in the resin particle described in Japanese Patent Application Laid-Open No. 2014-101492, a resin forming a shell layer does not have a unit derived from a cycloaliphatic-group-containing ethylenically unsaturated monomer. Accordingly, interaction by the cycloaliphatic group and interaction by a hydrogen bond or an ionic bond of the ionic group do not occur, and so the driving force of entanglement between resins forming the shell layer is insufficient. The time required for the entanglement between the resins forming the shell layer in between adjoining resin particles thereby becomes long, and moreover the frequency of the entanglement also becomes low, so that it is considered that the fixability and abrasion resistance became insufficient. Further, in the resin particle described in Japanese Patent Application Laid-Open No. 2014-208738, the THF-insoluble fraction of a shell layer is 0% by mass even when a resin forming the shell layer has the unit derived from the cycloaliphatic-group-containing ethylenically unsaturated monomer. Since interaction between plural resin chains constituting the resin of the shell layer is thereby small, the shell layer does not take a planar structure, and efficient fusion bonding between planes does not occur, so that it is considered that the fixability and abrasion resistance became insufficient.

The present inventors have carried out an investigation on the constitution of a resin particle having a core-shell structure on the basis of the above considerations. As a result, it has been found that in a recording medium to which an ink is applied, accelerating the entanglement between resins forming the shell layer between adjoining resin particles to form a resin film is important in order to realize the fixability and abrasion resistance at a high level. The present inventors have found constituent features for realizing them. The details thereof will hereinafter be described.

The ink according to the present invention contains a resin particle. The resin particle is composed of a first resin and a second resin which are different in composition. The resin particle has a first layer formed of the first resin and a second layer formed of the second resin in this order from the inside toward the outside of the resin particle and satisfies the following conditions (1) to (3).

(1) The second resin has a unit derived from a cycloaliphatic-group-containing ethylenically unsaturated monomer and a unit derived from an ionic-group-containing ethylenically unsaturated monomer. Further, the proportion of the unit derived from the ionic-group-containing ethylenically unsaturated monomer is 3% by mass or more to 70% by mass or less.

(2) The tetrahydrofuran-insoluble fraction of the second layer is 15% by mass or more.

(3) The proportion of the unit derived from the cycloaliphatic-group-containing ethylenically unsaturated monomer in the first resin is 10% by mass or less.

The condition (1) is first described. When in a recording medium to which an ink containing the resin particle is applied, entanglement of the second resin between adjoining resin particles occurs, the driving force thereof is generally owing to intermolecular force. When compared between compounds having the same number of carbon atoms, the melting point of a cycloalkane is generally higher than that of a linear alkane. For example, the melting point of n-hexane under an ordinary pressure (1 atm) is temperature −95° C., and the melting point of cyclohexane under an ordinary pressure (1 atm) is temperature 6.5° C. Here, the melting point is a temperature at which while applying thermal energy to regularly arranged molecules in a solid state, the mutually attracting force of molecules (intermolecular force) becomes weak to allow the molecules to move by thermal motion, thereby breaking up the regular arrangement to begin to become in an irregular state. Accordingly, since stronger intermolecular force acts between molecules as the melting point of a substance is higher, stronger intermolecular force acts on cyclohexane having a higher melting point than n-hexane. Therefore, since the second resin has the cyclic aliphatic group, not linear, stronger intermolecular force acts, and the driving force of the entanglement also becomes stronger.

Together with this, the second resin has an ionic group, whereby the hydrogen bond and the ionic bond are generated, so that the driving force of the entanglement is still more increased. The proportion of the unit derived from the ionic-group-containing ethylenically unsaturated monomer is 3% by mass or more, whereby an effect to increase the driving force of the entanglement is significantly produced. In addition, the proportion is 70% by mass or less, whereby the hydrophilicity of the second resin does not become too high, so that water separation from the resin particle after the ink is applied to the recording medium rapidly progresses, and the rate of mutual entanglement of the second resin also increases.

The condition (2) is then described. Since the THF-insoluble fraction is an index indicating the solubility of a resin in tetrahydrofuran which is a solvent that easily dissolves the resin, a resin constituting a resin particle tends to have a higher degree of steric freedom as this value is lower. Accordingly, when the THF-insoluble fraction of a certain resin is low to a certain extent of less than 15% by mass, it can be said that interaction between resins is small. In this case, the resin relatively freely conducts molecular motion. Since entanglement of a plurality of resins which freely move is required to take specific conformations each other, the progress thereof is slow in terms of the velocity theory.

Change (ΔG) in Gibbs free energy at this time is represented by the following equation.

$$\Delta G = \Delta H - T\Delta S$$

ΔH is enthalpy change, T is temperature, and ΔS is entropy change. It is understood from this equation that the value of ΔG becomes greater in a positive direction as ΔS is a negative greater value. In other words, when ΔH is constant, the entanglement is difficult to progress in terms of the equilibrium theory as decrease in degree of freedom is larger. Accordingly, the amount of entangled resins varies by a difference in the degree of freedom in an initial state unless there is a great difference in a final state of the entanglement.

When the THF-insoluble fraction of the second layer is high to a certain extent of 15% by mass or more, it can be said that chemical bonding force or physical interaction in the second resin is strong. As specific examples of such bonding or interaction, there are mentioned covalent bond between resins formed by a crosslinkable monomer, hydrogen bond between functional groups having an atom high in electronegativity, and intermolecular force. In the condition where the bonding force or interaction in the second resin is strong, the degree of freedom relatively decreases, and the entanglement is easy to progress in terms of the velocity theory and the equilibrium theory. In other words, in a state of a linear chain due to small interaction between plural resin chains constituting the second resin, the fusion bonding between the adjoining resin particles caused after applied to the recording medium is caused between the linear resin chains, so that the efficiency thereof is poor. On the contrary, in a state of a planar structure owing to great interaction between plural resin chains constituting the second resin, the fusion bonding between the adjoining resin particles caused after applied to the recording medium is caused between planes formed by the resin chains, so that the fusion bonding rapidly progresses at high efficiency. As a result of an investigation by the present inventors, such a state that the chemical bonding force or physical interaction is strong is obtained so long as the THF-insoluble fraction of the second resin is 15% by mass or more.

Finally, the condition (3) is described. When the cycloaliphatic group is present in the first layer, strong intermolecular force acts at an interface between the first layer and the second layer to suppress the spread of the second layer. Accordingly, the entanglement of the resin decreases in the recording medium. In order to cause the fusion bonding between the adjoining resin particles to rapidly progress, it is necessary to suppress the interaction caused between the first layer and the second layer as much as possible. Therefore, there is need to reduce the proportion of the cycloaliphatic group in the first resin. As a result of an investigation by the present inventors, the suppression of the spread of the second layer can be reduced so long as the proportion of the unit derived from the cycloaliphatic-group-containing ethylenically unsaturated monomer is 10% by mass or less.

As described above, the respective constituent features (1) to (3) are satisfied at the same time, whereby the effect of the present invention can be achieved. The elements constituting the present invention will hereinafter be described by specific examples.

Aqueous Ink:

The ink according to the present invention is an aqueous ink for ink jet which contains a resin particle. Components usable in the ink according to the present invention will hereinafter be described respectively. When being written as "(meth)acrylic acid", "(meth)acrylate" and "(meth)acryloyl" hereinafter, they mean "acrylic acid or methacrylic acid", "acrylate or methacrylate" and "acryloyl or methacryloyl", respectively.

Resin Particle

In the present invention, "resin particle" means a resin which is dispersed in an aqueous medium and can be present in the aqueous medium in a state of having a particle diameter. In other words, the resin particle is present in a state of being dispersed in the ink, i.e., in a state of a resin emulsion. The content (% by mass) of the resin particle in the ink is favorably 1% by mass or more to 30% by mass or less, more favorably 3% by mass or more to 20% by mass or less based on the total mass of the ink.

Whether a certain resin is "resin particle" or not can be judged according to the following method. First, a liquid containing a resin neutralized with an alkali (sodium hydroxide, potassium hydroxide or the like) equivalent to an acid value (resin solid content: 10% by mass) is prepared. The prepared liquid is then 10 times diluted (based on volume) with pure water to prepare a sample solution. When the particle diameter of the resin in the sample solution is then measured by a dynamic light scattering method, the resin can be judged to be "resin particle" if a particle having a particle diameter is observed. Measurement conditions at this time may be set to SetZero: 30 seconds, measuring number: 3 times, measuring time: 180 seconds, shape: true sphere and refractive index: 1.59. As a particle size distribution measuring apparatus, a particle size analyzer according to the dynamic light scattering method (for example, trade name "UPA-EX150", manufactured by NIKKISO CO., LTD.) may be used. Needless to say, the particle size distribution measuring apparatus and measurement conditions used are not limited to the above ones.

The volume-average particle diameter (D50) of the resin particle is favorably 25 nm or more to 600 nm or less, more favorably 50 nm or more to 300 nm or less. Further, even when D50 is relatively small, e.g. 50 nm or more to 100 nm or less, the effect of the present invention can be exhibited so long as the resin particle is a resin particle satisfying the constitution of the present invention. The volume-average particle diameter of the resin particle can be measured under the same conditions as in the method for judging whether the resin is a resin particle or not. In addition, the weight-average molecular weight (Mw) of the resin particle in terms of polystyrene which is determined by a gel permeation chromatography (GPC) is favorably 3,000 or more to 1,000,000 or less.

The THF-insoluble fraction as the whole of the resin particle is favorably 80% by mass or less. If the THF-insoluble fraction exceeds 80% by mass, the fusion bonding between the adjoining resin particles is difficult to occur, and so the effect to improve the abrasion resistance may not be sufficiently achieved in some cases. On the other hand, the THF-insoluble fraction as the whole of the resin particle is favorably 5% by mass or more.

The THF-insoluble fraction of the resin particle is calculated according to the following method. The THF-insoluble fractions of the respective layers of the resin particle can be calculated according to this method. A liquid containing a resin which is a measuring object is dried and solidified to obtain a solid resin. This resin is added into THF in such a manner the content of the resin is 0.5% by mass, and stirring is conducted for 24 hours at a temperature of 25° C. Thereafter, a resin which is not dissolved is recovered by filtration, and the resin is dried for 2 hours at a temperature of 80° C. and then weighed to calculate the THF-insoluble fraction (% by mass) according to the equation, [(Mass of the resin not dissolved)/(Mass of the resin added)]×100. Incidentally, when an alkaline component used for neutralizing the ionic group or the like is present, the THF-insoluble fraction may be difficult to exactly measure in some cases. Accordingly, when the alkaline component is present in the sample which is the measuring object, a sample from which the alkaline component has been removed in advance is favorably used. In addition, in the process of preparing the aqueous dispersion liquid containing the resin particle, the THF-insoluble fraction of the resin may also be measured at a point of time before the alkaline component is added.

The surface charge quantity of the resin particle which is an index indicating the density of the ionic group of the resin particle is favorably 1 $\mu mol/m^2$ or more to 500 $\mu mol/m^2$ or less, more favorably 1 $\mu mol/m^2$ or more to 50 $\mu mol/m^2$ or less. The surface charge quantity of the resin particle is calculated according to the following method. After the resin particle is first taken out of an ink or the like by a proper method, the resin particle is added into water to adjust the pH of the liquid to pH 2 with a mineral acid such as hydrochloric acid, and stirring is conducted for 24 hours. Thereafter, centrifugal separation is conducted, and a precipitated resin is recovered followed by being dried and solidified. After this resin is ground, 1 g of the resin is taken out, 30 g of a 0.1 mol/L aqueous solution of sodium hydrogencarbonate is added thereto, and stirring is conducted for 15 hours to obtain a liquid containing the resin. One gram of the resultant liquid is taken out and diluted to 15 g with pure water to obtain a diluted liquid. On the resin particle in this diluted liquid, colloidal titration utilizing a potential difference is conducted to determine the charge quantity per unit mass of the resin particle. The resultant charge quantity is divided by the surface area par unit mass calculated from the volume-average particle diameter measured according to the above-described method, thereby determining the surface charge quantity. The titration may be conducted by using a titrant such as 0.1 mol/L hydrochloric acid by means of a titrating apparatus such as an automatic potentiometric titrator (trade name "AT510", manufactured by KYOTO ELECTRONICS MANUFACTURING CO., LTD.) in which a streaming potential detection unit (PCD-500) is installed. Needless to say, the measuring apparatus and measuring conditions used are not limited to the above ones.

The glass transition temperature of the resin particle is favorably 0° C. or more to 200° C. or less. The glass transition temperature is calculated according to the following method by means of a differential scanning calorimeter (DSC). A resin particle taken out of an ink or the like by a proper method is first dried and solidified at a temperature of 60° C. Two milligrams of this resin is taken out and sealed in an aluminum container. A thermal analysis is then conducted according to the following temperature program by means of a differential scanning calorimeter. The temperature is first raised to 200° C. at a rate of 10° C./min and then lowered from 200° C. to −50° C. at a rate of 5° C./min. The thermal analysis is then conducted while raising the temperature from −50° C. to 200° C. at a rate of 10° C./min to measure the glass transition temperature. The measurement may be conducted by means of an apparatus such as a differential scanning calorimeter (trade name "DSC Q1000", manufactured by TA Instruments Co.). Needless to say, the measuring apparatus and temperature program used are not limited to the above ones.

When a heating step for fixing an image is provided in the ink jet recording method using the ink according to the present invention, the heating temperature is favorably set to the same temperature as the glass transition temperature of the resin particle or a temperature higher than the glass transition temperature for accelerating the fusion bonding between the adjoining resin particles. Specifically, the heating temperature is favorably set to a range of 25° C. or more to 200° C. or less.

The resin particle has a first layer formed of the first resin and a second layer formed of the second resin in this order from the inside toward the outside of the resin particle. For example, the first layer may be a core particle of the resin particle, and the second layer may be provided so as to cover the core particle. In this case, another layer may also be present between the first layer and the second layer so long as the effect of the present invention is not impaired. In addition, another layer may also be present outside the second layer. In addition, the resin particle may also have a core particle, and have the first layer and the second layer in this order so as to cover the core particle. In this case, other layers may also be present respectively between the core particle and the first layer and between the first layer and the second layer so long as the effect of the present invention is not impaired. In addition, another layer may also be present outside the second layer.

Further, the resin particle favorably has a third layer formed of a unit derived from a reactive surfactant bonded to the second layer. The third layer is favorably present outside the second layer and in contact with the second layer. In particular, the resin particle is favorably a resin particle composed of three layers and having the first layer, the second layer and the third layer in this order from the inside toward the outside of the resin particle. The respective layers will hereinafter be described.

First Layer

The first layer of the resin particle is formed of a first resin in which the proportion of a unit derived from a cycloaliphatic-group-containing ethylenically unsaturated monomer is 10% by mass or less. Intermolecular force between the first resin and a second resin having the unit derived from the cycloaliphatic-group-containing ethylenically unsaturated monomer does thereby not become too strong. Accordingly, in a recording medium to which an ink containing the resin particle is applied, the second resin well spreads and becomes entangled between adjoining resin particles, whereby good fixability and abrasion resistance can be attained. The proportion is favorably 5% by mass or less, more favorably 3% by mass or less, particularly favorably 1% by mass or less, because the fixability and abrasion resistance can be attained at a far excellent level. Above all, the proportion is particularly favorably 0% by mass, that is, the first resin does not have the unit derived from the cycloaliphatic-group-containing ethylenically unsaturated monomer. Specific examples of the cycloaliphatic-group-containing ethylenically unsaturated monomer are mentioned in the explanation of the second layer described later.

The THF-insoluble fraction of the first layer is favorably 15% by mass or less, more favorably 5% by mass or less, particularly favorably 3% by mass or less. The THF-insoluble fraction of the first layer may also be 0% by mass. The interaction caused between the first resins becomes weaker as the THF-insoluble fraction of the first layer is lower. When an ink containing the resin particle is applied to the recording medium, the resin forming the first layer flows out outside the second layer to cause fusion bonding between the adjoining resin particles, so that a resin film can be formed to attain the abrasion resistance at a far excellent level. The THF-insoluble fraction of the first layer is determined by calculating the fraction according to the above-described method only for the first layer separated from the resin particle or by calculating the fraction according to the above-described method for the resin used as the first layer. In order to control the THF-insoluble fraction of the first layer to 15% by mass or less, the proportion of a unit derived from a monomer capable of forming a covalent bond or a hydrogen bond between resins in the first resin is favorably suitably controlled.

As for the monomer capable of forming the covalent bond between resins, there is mentioned a crosslinkable monomer. The crosslinkable monomer is a monomer having, in its molecule, two or more polymerizable functional groups which can cause a polymerization reaction such as an ethylenically unsaturated bond. As described above, when an ink containing the resin particle is applied to a recording medium, the resin forming the first layer flows out outside the second layer to cause fusion bonding between the adjoining resin particles to form a resin film. In order to more improve the abrasion resistance, it is important that the resin film formed in this manner is not too rigid and has a certain flexibility. However, the covalent bond is very stable, and the entanglement between the resins is excessively strengthened. Therefore, the formed resin film is too rigid and tends to become brittle, and so the abrasion resistance is somewhat lowered. Accordingly, in order to attain the abrasion resistance at a far excellent level, the proportion of the unit derived from the crosslinkable monomer in the first resin is favorably 3% by mass or less, more favorably 0.5% by mass or less. Above all, the proportion is particularly favorably 0% by mass, that is, the first resin does not have the unit derived from the crosslinkable monomer. Specific examples of the crosslinkable monomer are mentioned in the explanation of the second layer described later.

As examples of the monomer capable of forming the hydrogen bond between different resins, there are mentioned monomers containing at least one functional group selected from the group consisting of a carboxy group, an alcoholic hydroxy group and a silanolic hydroxy group. The alcoholic hydroxy group represents a C(OH) group with a hydroxy group bonded to a non-aromatic carbon atom, and the silanolic hydroxy group represents an Si(OH) group with a hydroxy group bonded to a silicon atom. As described above, when an ink containing the resin particle is applied to a recording medium, the resin forming the first layer flows out outside the second layer to cause fusion bonding between the adjoining resin particles to form a resin film. In order to more improve the abrasion resistance, it is important that the resin film formed in this manner is not too rigid and has a certain flexibility. However, since the above-described respective functional groups have a hydrogen atom capable of forming the hydrogen bond and an oxygen atom, complementary two hydrogen bonds are formed between a set of functional groups or a lot of hydrogen bonds are formed between the resins, so that the entanglement between the first resins is excessively strengthened. Therefore, the formed resin film is too rigid and tends to become brittle, and so the abrasion resistance is somewhat lowered. Accordingly, in order to attain the abrasion resistance at a far excellent level, the proportion of a unit derived from a monomer containing each of the respective functional groups in the first resin is favorably 5% by mass or less, more favorably 1% by mass or less. Above all, the proportion is particularly favorably 0% by mass, that is, the first resin does not have such a unit.

As specific examples of the monomer containing the carboxy group, there are mentioned (meth)acrylic acid and p-vinylbenzonic acid. As specific examples of the monomer containing the alcoholic hydroxy group, there are mentioned 2-hydroxyethyl (meth)acrylate and 2,3-dihydroxypropyl (meth)acrylate. As specific examples of the monomer containing the silanolic hydroxy group, there is mentioned vinylsilanetriol.

In addition, in order to control the THF-insoluble fraction of the first layer to 15% by mass or less, it is favorable to use a non-crosslinkable monomer when the first resin is polymerized. In other words, the first resin favorably has a unit derived from the non-crosslinkable monomer. The non-crosslinkable monomer has, in its molecule, only one polymerizable functional group capable causing a polymerization reaction such as an ethylenically unsaturated bond. As specific examples thereof, there are mentioned alkenes such as ethylene and propylene; carboxy-group-containing monomers such as (meth)acrylic acid; linear or branched chain alkyl (meth)acrylates such as methyl (meth)acrylate, butyl (meth)acrylate, lauryl (meth)acrylate and hexadecyl (meth)acrylate; aromatic-group-containing monomers such as styrene and allylbenzene; cycloaliphatic-group-containing monomers such as cyclohexyl (meth)acrylate and isobornyl (meth)acrylate. These may be used either singly or in any combination thereof. Among these, alkenes having 1 to 22 carbon atoms; (meth)acrylic acid; linear or branched chain alkyl (meth)acrylates the alkyl group of which has 1 to 22 carbon atoms; styrene; and cyclohexyl (meth)acrylate are favorably used. In addition, linear or branched chain alkyl (meth)acrylates the alkyl group of which has 1 to 12 carbon atoms are more favorably used because the thermophysical properties such as glass transition temperature are easy to adjust, and the properties of the film formed are excellent. Among these, ethyl (meth)acrylate and butyl (meth)acrylate are particularly favorable.

The proportion of the unit derived from the non-crosslinkable monomer in the first resin is favorably 80% by mass or more, more favorably 90% by mass or more, particularly favorably 95% by mass or more. Above all, the proportion is particularly favorably 100% by mass, that is, the first resin has only the unit derived from the non-crosslinkable monomer. In addition, it is favorable that the first resin does not have the unit derived from the cycloaliphatic-group-containing ethylenically unsaturated monomer or the unit derived from the specific monomer forming the hydrogen bond as described above. Accordingly, the first resin is most favorably composed of only the unit derived from the linear alkyl (meth)acrylate the alkyl group of which has 1 to 12 carbon atoms which is the unit derived from the non-crosslinkable monomer.

Incidentally, the proportion of a unit having no Si—O bond in the first resin is favorably 95% by mass or more, more favorably 99% by mass or more. Above all, the proportion is particularly favorably 100% by mass, that is, the first resin has only the unit having no Si—O bond. Since silicon has an atomic weight greater than that of carbon, a resin having a unit having the Si—O bond has strong intermolecular force compared with a resin composed of a carbon chain. Accordingly, the first resin has the Si—O bond, whereby the intermolecular force with the second resin having the unit derived from the cycloaliphatic-group-containing ethylenically unsaturated monomer becomes too strong. In a recording medium to which an ink containing the resin particle is applied, the second resin is thereby difficult to spread, and the entanglement between the adjoining resin particles is hard to occur, so that the fixability and abrasion resistance may not be sufficiently attained in some cases.

The first layer is formed of the first resin. However, the first layer may contain another resin than the first resin so long as the effect of the present invention is not impaired. The proportion (% by mass) of the first resin in the first layer is favorably 90% by mass or more, more favorably 95% by mass or more based on the total mass of the first layer. The proportion is particularly favorably 100% by mass, that is, the first layer is formed of only the first resin.

The proportion (% by mass) of the first layer in the resin particle is favorably 30% by mass or more to 90% by mass or less based on the total mass of the resin particle. Incidentally, when the first layer is not the core particle, the first layer comes to cover at least a part of the core particle or of a layer inside the first layer. The covering rate thereof may not be 100%. Specifically, the first layer favorably covers 20% or more, based on the surface area, of the core particle or the layer inside the first layer, more favorably covers 50% or more thereof, particularly favorably covers 70% or more thereof.

Second Layer

The second layer of the resin particle is required to satisfy the following conditions. (1) The THF-insoluble fraction is 15% by mass or more. (2) The second layer is formed of a second resin having a unit derived from a cycloaliphatic-group-containing ethylenically unsaturated monomer and a unit derived from an ionic-group-containing ethylenically unsaturated monomer. (3) The proportion of the unit derived from the ionic-group-containing ethylenically unsaturated monomer in the second resin is 3% by mass or more to 70% by mass or less. As described above, these conditions are satisfied, whereby in a recording medium to which an ink containing the resin particle is applied, the second resin well spreads, and the entanglement between the adjoining resin particles rapidly and firmly occurs. Good fixability and abrasion resistance can be thereby attained.

In order to efficiently cause the entanglement between the resins in the second resin, the degree of steric freedom is favorably low to some extent compared with the first resin. Therefore, the THF-insoluble fraction of the second layer is favorably higher than the THF-insoluble fraction of the first resin, that is, more than 15% by mass. Above all, the fraction is more favorably 20% by mass or more to 80% by mass or less, particularly favorably 25% by mass or more to 75% by mass or less, most favorably 30% by mass or more to 70% by mass or less. The THF-insoluble fraction of the second layer is favorably 95% by mass or less. In addition, a difference in the THF-insoluble fraction between the second layer and the first layer is favorably 5% by mass or more, more favorably 10% by mass or more, particularly favorably 20% by mass or more. On the other hand, the difference in the THF-insoluble fraction between the second layer and the first layer is favorably 60% by mass or less.

In order to control the THF-insoluble fraction of the second layer to 15% by mass or more, it is favorable to use a crosslinkable monomer upon the polymerization of the second resin. In other words, the second resin favorably has a unit derived from the crosslinkable monomer. Further, the proportion of the unit derived from the crosslinkable monomer in the second resin is 5% by mass or more to 50% by mass or less, more favorably 10% by mass or more to 40% by mass or less, particularly favorably 15% by mass or more to 30% by mass or less. Above all, the proportion is particularly favorably 15% by mass or more to 25% by mass or less. The proportion is 5% by mass or more, whereby the effect obtained by this unit can be sufficiently exhibited to attain the fixability and abrasion resistance at a far excellent level. In addition, the proportion is 50% by mass or less, whereby the degree of steric freedom of the second resin does not become too low, and the entanglement between the resin particles sufficiently occurs, so that the fixability and abrasion resistance can be attained at a far excellent level.

As described above, the crosslinkable monomer is a monomer having, in its molecule, two or more polymerizable functional groups such as ethylenically unsaturated bonds. As specific examples of the monomer, there are mentioned dienes such as butadiene and isoprene; difunctional (meth)acrylates such as 1,4-butanediol di(meth)acrylate, 1,9-nonanediol di(meth)acrylate, (mono-, di-, tri-, poly-)ethylene glycol di(meth)acrylates, (mono-, di-, tri-, poly-)propylene glycol di(meth)acrylates, (mono-, di-, tri-, poly-)tetramethylene glycol di(meth)acrylates, ethylene-oxide-modified bisphenol A di(meth)acrylate, 2-hydroxy-3-(meth)acryloyloxypropyl methacrylate, propoxylated and ethoxylated bisphenol A di(meth)acrylate, ethoxylated bisphenol A di(meth)acrylate, 9,9-bis(4-(2-(meth)acryloyloxyethoxy)phenyl)fluorene, tricyclodecane-dimethanol di(meth)acrylate, 1,10-decanediol di(meth)acrylate, 1,6-hexanediol di(meth)acrylate, neopentyl glycol di(meth)acrylate, ethoxylated polypropylene glycol di(meth)acrylate and glycerol di(meth)acrylate; trifunctional (meth)acrylates such as tris(2-(meth) acryloyloxyethyl) isocyanurate, trimethylolpropane tri(meth)acrylate, tris(2-hydroxyethyl) isocyanurate tri(meth)acrylate, ethoxylated trimethylolpropane tri(meth)acrylate, pentaerythritol tri(meth)acrylate, propoxylated trimethylolpropane tri(meth)acrylate, propoxylated glycerol tri(meth)acrylate, ethoxylated isocyanuric acid tri(meth)acrylate, ε-caprolactone-modified tris(2-(meth)acryloyloxyethyl) isocyanurate and ethylene-oxide-modified trimethylolpropane tri(meth)acrylate; tetrafunctional (meth)acrylates such as ditrimethylolpropane tetra(meth)acrylate, ethoxylated pentaerythritol tetra(meth)acrylate and pentaerythritol tetra(meth)acrylate; and divinylbenzene. These may be used either singly or in any combination thereof.

Among these, a crosslinkable monomer having two ethylenically unsaturated bonds is favorable because aggregation caused by excessive crosslinking of plural resin particles upon polymerization is inhibited to obtain a resin particle having a uniform particle diameter. Since such a resin particle forms an even resin film, the fixability and abrasion resistance can be attained at a far excellent level. As examples of favorable monomers among the crosslinkable monomers having two ethylenically unsaturated bonds, there are mentioned 1,4-butanediol di(meth)acrylate and (mono-, di-, tri-, poly-)ethylene glycol di(meth)acrylates. In particular, 1,4-butanediol di(meth)acrylate and ethylene glycol dimethacrylate are favorable.

The second resin has a unit derived from a cycloaliphatic-group-containing ethylenically unsaturated monomer. The proportion of the unit derived from the cycloaliphatic-group-containing ethylenically unsaturated monomer in the second resin is favorably 20% by mass or more to 90% by mass or less, more favorably 20% by mass or more to 80% by mass or less. Above all, the proportion is favorably 20% by mass or more to 60% by mass or less, more favorably 22% by mass or more to 55% by mass or less, particularly favorably 25% by mass or more to 50% by mass or less. The proportion is 20% by mass or more, whereby the effect obtained by this unit can be sufficiently exhibited to attain the fixability and abrasion resistance at a far excellent level. In addition, the proportion is 90% by mass or less, whereby the intermolecular force within the second layer does not become too strong, and the second resin well spreads and becomes sufficiently entangled between the adjoining resin particles, so that the fixability and abrasion resistance can be attained at a far excellent level. Further, the second resin forming the second layer has the unit derived from the cycloaliphatic-group-containing ethylenically unsaturated monomer, whereby the hydrophobicity of the resin film is easy to become high. Therefore, when touching an image with sweaty fingers or the like, the resin forming the resin film is hard to be dissolved, and so that portion is hard to come off.

The cycloaliphatic group in the cycloaliphatic-group-containing ethylenically unsaturated monomer is a cyclic non-aromatic hydrocarbon group. As examples of the ring structure, there are mentioned monocyclic and polycyclic hydrocarbon groups. As examples of the cycloaliphatic group, there are mentioned monocyclic aliphatic groups such as cycloalkyl groups having 3 to 10 carbon atoms and cycloalkenyl groups having 3 to 10 carbon atoms; and polycyclic aliphatic groups having 4 to 18 carbon atoms. The cycloaliphatic group may further have a substituent such as a halogen atom such as a fluorine atom, a chlorine atom and a bromine atom; an alkyl group such as a methyl group, an ethyl group, a normal propyl group, an isopropyl group, a normal butyl group, a tertiary butyl group or an octyl group; a nitro group; an amino group; a hydroxy group; a sulfo group; or a carboxy group. The alkyl group as the substituent may be further substituted with a halogen atom or the like.

As specific examples of the cycloaliphatic-group-containing ethylenically unsaturated monomer, there are mentioned monocyclic (meth)acrylates such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate and cyclodecyl (meth)acrylate; bicyclic (meth)acrylates such as isobornyl (meth)acrylate and norbornyl (meth)acrylate; and tricyclic (meth)acrylates such as adamantyl (meth)acrylate, dicyclopentanyl (meth)acrylate and dicyclopentenyloxyethyl (meth)acrylate. These may be used either singly or in any combination thereof. Among these, cyclohexyl (meth)acrylate and isobornyl (meth)acrylate are favorable because reactivity upon polymerization is good, and moreover the stability of the resulting resin particle is excellent.

The proportion of the unit derived from the aromatic-group-containing ethylenically unsaturated monomer in the second resin is favorably less than 20% by mass, more favorably 10% by mass or less. Above all, the proportion is particularly favorably 0% by mass, that is, the second resin does not have the unit derived from the aromatic-group-containing ethylenically unsaturated monomer. The proportion is less than 20% by mass, whereby π-π stacking due to the aromatic group within the second layer does not become too strong, the second resin well spreads and becomes sufficiently entangled between the adjoining resin particles, so that the fixability and abrasion resistance can be attained at a far excellent level.

The second resin has a unit derived from an ionic-group-containing ethylenically unsaturated monomer. The proportion of the unit derived from the ionic-group-containing ethylenically unsaturated monomer in the second resin is 3% by mass or more to 70% by mass or less, favorably 5% by mass or more to 60% by mass or less, more favorably 7% by mass or more to 50% by mass or less.

As examples of the ionic group in the ionic-group-containing ethylenically unsaturated monomer, there are mentioned anionic groups such as a carboxy group, a phenolic hydroxy group and a phosphoric acid ester group; and cationic groups such as an amino group and an ammonium group. Above all, the ionic group is favorably the carboxy group because the stability of the resin particle in the ink is good, and moreover the fixability and the abrasion resistance can be attained at a far excellent level. As specific examples of the ionic-group-containing ethylenically unsaturated monomer, there are mentioned (meth)acrylic acid, p-vinylbenzoic acid, 4-vinylphenol, β-carboxyethyl (meth)acrylate, (methacrylic acid-2-hydroxyethyl) phosphate, 2-(dimethylamino)ethyl (meth)acrylate and 2-(acryloyloxy)-ethyltrimethylammonium chloride. These may be used either singly or in any combination thereof. Among these, (meth)acrylic acid is favorable as the ionic-group-containing ethylenically unsaturated monomer.

Similarly to the first resin, a non-crosslinkable monomer may be used also upon the polymerization of the second resin. The specific examples of the non-crosslinkable monomer are the same as those mentioned in the description of the first resin. The proportion of the unit derived from the non-crosslinkable monomer in the second resin is favorably 50% by mass or more to 97% by mass or less, more favorably 60% by mass or more to 90% by mass or less, particularly favorably 70% by mass or more to 85% by mass or less. Above all, the proportion is particularly favorably 75% by mass or more to 85% by mass or less. Incidentally, the proportion of the unit derived from the non-crosslinkable monomer is a proportion including that of the units derived from the cycloaliphatic-group-containing ethylenically unsaturated monomer and the ionic-group-containing ethylenically unsaturated monomer when these monomers are non-crosslinkable.

The non-crosslinkable monomer favorably includes a linear alkyl (meth)acrylate the alkyl group of which has 1 to 12 carbon atoms, particularly favorably includes methyl (meth)acrylate or ethyl (meth)acrylate.

The total proportion of a unit derived from at least one monomer selected from the group consisting of methyl (meth)acrylate and ethyl (meth)acrylate and a unit derived from (meth)acrylic acid in the second resin is favorably 70% by mass or less. The proportion is more favorably 65% by mass or less, particularly favorably 60% by mass or less.

The second layer is formed of the second resin. However, the second layer may contain another resin than the second resin so long as the effect of the present invention is not impaired. The proportion (% by mass) of the second resin in the second layer is favorably 90% by mass or more, more favorably 95% by mass or more based on the total mass of the second layer. The proportion is particularly favorably 100% by mass, that is, the second layer is formed of only the second resin.

The proportion (% by mass) of the second layer in the resin particle is favorably 2% by mass or more to 70% by mass or less based on the total mass of the resin particle.

Incidentally, when the second layer adjoins the first layer, the second layer comes to cover at least a part of the first layer. The covering rate thereof may not be 100%. Specifically, the second layer favorably covers 20% or more, based on the surface area, of the first layer, more favorably covers 50% or more thereof, particularly favorably covers 70% or more thereof.

The thickness of the second layer is favorably 1 nm or more to 30 nm or less. In addition, the thickness of the first layer is favorably 5 times or more to 1,000 times or less as much as the thickness of the second layer, more favorably 5 times or more to 60 times or less. When the first layer is the core particle of the resin particle, the particle diameter of that core particle is taken as the thickness of the first layer. The thicknesses of the respective layers can be calculated from a difference in particle diameter before and after the formation of the respective layers. For example, after the particle diameter of a resin particle having the first layer is measured, the particle diameter of a resin particle formed by being covered with the second resin is further measured to determine the thickness of the second layer from a difference between these particle diameters.

Third Layer

The resin particle favorably further has a third layer formed of a unit derived from a reactive surfactant bonded to the second layer (second resin). The "bonding" of the third layer to the second layer means the formation of a chemical bond. Such a third layer is provided, whereby a hydrophilic site of the unit derived from the reactive surfactant forms a hydrogen bond with an ionic group of another resin particle when the second resin entangles between the adjoining resin particles. The entanglement between the adjoining resin particles is thereby strengthened, so that the fixability and abrasion resistance can be attained at a far excellent level. On the other hand, a surfactant physically adsorbed on the second layer does not correspond to "the reactive surfactant bonded to the second layer". For example, when the surfactant is physically adsorbed on the resin particle having the first layer and the second layer in this order, this surfactant does not come to be bonded to the second layer. Since the surfactant physically adsorbed, not chemical bonding, on the second layer is easy to separate, such a surfactant does not have an effect to enhance the bonding force between adjoining resin particles, and so an effect to more improve the fixability and abrasion resistance is not brought about.

Whether the reactive surfactant is bonded to the second layer or not can be judged by the following processes (i) to (iii). A process for extracting a resin particle from an ink to analyze it will hereinafter be described. However, a resin particle extracted from an aqueous dispersion liquid or the like may also be analyzed likewise.

(i) Extraction of Resin Particle

A resin particle is separated from an ink containing the resin particle by a density-gradient centrifugation. The resin particle can be separated and extracted by a difference in sedimentation coefficient between components in a density-gradient sedimentation velocity method or by a difference in density between components in a density-gradient sedimentation equilibrium method.

(ii) Identification of Layer Structure and Separation

The resin particle is stained with ruthenium tetraoxide and subjected to an immobilization treatment. Thereafter, the resin particle is embedded in an epoxy resin for stably holding the resin particle. The resin particle embedded in the epoxy resin is then cut out by an ultramicrotome to observe its section through a scanning transmission electron microscope (STEM). The layer structure of the resin particle can be identified from a section cut out through the center of gravity of the resin particle. By utilizing this sample, a quantitative analysis of elements contained can also be made by STEM-EDX juxtaposing an energy dispersive X-ray spectroscopy (EDX). After the features of elements contained in respective layers are grasped in this manner, resins forming the respective layers are separated.

(iii) Analysis of Unit (Monomer) Forming Resin of Each Layer

A resin particle used for separating the resin of each layer may be either in a state of a dispersion liquid or in a state of being formed into a film by drying. The resin particle is dissolved in an organic solvent which can dissolve this particle. The resultant solution is used to separate each layer by gel permeation chromatography and to take out a resin forming each layer. The resin taken out is then subjected to an elemental analysis by a combustion method. Separately from this, the resin is pretreated by an acid decomposition (addition of hydrofluoric acid) method or an alkali fusion method to conduct a quantitative analysis of an inorganic component by an inductively coupled plasma emission spectrometry. What layer the resin forms can be known by comparing this analyzed result with the quantitative analysis of the elements by STEM-EDX obtained in the above process (ii).

The resin taken out is analyzed by a nuclear magnetic resonance (NMR) spectrometry and a matrix assisted laser desorption ionization mass spectrometry (MALDI-MS). The kinds and proportions of the constituent unit (monomer) of the resin and the unit derived from the reactive surfactant bonded to the second layer can be thereby found. Further, the resin is analyzed by a pyrolysis gas chromatography, whereby a monomer produced by depolymerization can also be directly detected.

"Reactive surfactant" is a compound having a hydrophilic site, a hydrophobic site and an ethylenically unsaturated bond in its molecule. The hydrophilic site is a portion of an ionic group or an ethylene oxide structure, and the hydrophobic site is another portion than the hydrophilic site and the ethylenically unsaturated bond site. The reactive surfactant is introduced into the resin particle by chemical bonding to the second resin by a reaction of the ethylenically unsaturated bond to form the third layer as the unit derived from the reactive surfactant. The third layer is favorably formed by only the unit derived from the reactive surfactant bonded to the second layer.

The resin particle having the third layer is stably dispersed owing to repulsion by steric hindrance of the reactive surfactant. Further, when an ink containing the resin particle is applied to an ink jet system, the clogging of an ejection orifice of a recording head and the adhesion of the resin particle to the periphery of the ejection orifice are inhibited to improve the ejection stability of the ink. The reason for this is because the surfactant contributing to the dispersion of the resin particle is bonded to the resin particle, and so it is hard to come off even when shearing force is applied to an ink droplet upon ejection.

A compound with a (meth)acryloyl group, a maleyl group, a vinyl group, an allyl group or the like bonded to the interior or terminal of a molecule of a polyoxyalkylene alkyl ether is favorably used as the reactive surfactant. As specific examples thereof, there are mentioned polyoxyethylene nonylpropenyl phenyl ether (trade name "Aqualon" RN-20, RN-30, RN-50, products of DSK Co., Ltd.); polyoxyethylene nonylpropenyl phenyl ether ammonium sulfate (trade name "Aqualon" HS-10, BC-0515, BC-10, BC-20, products of DSK Co., Ltd.); polyoxyethylene-1-(allyloxymethyl) alkyl ether ammonium sulfate (trade name "Aqualon" KH-05, KH-10, products of DSK Co., Ltd.); α-hydro-ω-(1-alkoxymethyl-2-(2-propenyloxy)ethoxy)-poly(oxy-1,2-ethandiyl) (trade name "ADEKA REASOAP" ER-10, ER-20, ER-30, ER-40, products of ADEKA CORPORATION); α-[1-[(allyloxy)methyl]-2-(nonylphenoxy)-ethyl]-ω-hydroxypolyoxyethylene (trade name "ADEKA REASOAP" NE-10, NE-20, NE-30, NE-40, NE-50, products of ADEKA CORPORATION); α-sulfo-ω-(1-alkoxymethyl-2-(2-propenyloxy)-ethoxy)-poly(oxy-1,2-ethandiyl) ammonium salts (trade name "ADEKA REASOAP" SR-10S, SR-10, SR-20, SR-3025, SE-10N, SE-20N, products of ADEKA CORPORATION); 2-sodium sulfoethyl methacrylate (trade name "Antox MS-2N, product of Nippon Nyukazai Co., Ltd.); bis(polyoxyethylene polycyclic phenyl ether) methacrylate sulfate salt (trade name "Antox MS-60, product of Nippon Nyukazai Co., Ltd.); alkoxypolyethylene glycol methacrylate (trade name "Antox" LMA-10, LMA-20, LMA-27, products of Nippon Nyukazai Co., Ltd.); alkoxy-polyethylene glycol maleate (trade name "Antox" SMH-20, LMH-20, EMH-20, products of Nippon Nyukazai Co., Ltd.); polyoxy-alkylene alkenyl ether (trade name "LATEMUL" PD-420, PD-430, PD-450, products of Kao Corporation); polyoxyalkylene alkenyl ether ammonium sulfate (trade name "LATEMUL PD-105", product of Kao Corporation); vinyl ether alkoxylate (trade name "Emulsogen" R208, R307, products of Clariant Co.); alkylallylsulfosuccinic acid salt (trade name "ELEMINOL JS-20", product of Sanyo Chemical Industries, Ltd.); polyoxy-alkylene methacrylate sulfate salt (trade name "ELEMINOL RS-3000", product of Sanyo Chemical Industries, Ltd.); and unsaturated phosphate (trade name "Maxemul" 6106, 6112, products of Croda Co.). These may be used either singly or in any combination thereof.

When the resin particle has the third layer, the proportion (% by mass) of the third layer in the resin particle is favorably 1% by mass or more to 20% by mass or less, more favorably 1% by mass or more to 10% by mass or less based on the total mass of the resin particle. Above all, the proportion is particularly favorably 1% by mass or more to 5% by mass or less. In addition, it is favorable that the third layer covers only a part of the second layer and does not cover the whole thereof. Specifically, the third layer favorably covers 50% or less, based on the surface area, of the second layer, more favorably covers 30% or less thereof, particularly favorably covers 10% or less thereof.

Production Process for Resin Particle

Any publicly known processes may be used as a production process for the resin particle so long as they satisfy the above-described constituent features of the present invention. As examples thereof, there are mentioned an emulsion polymerization process, a pre-emulsion polymerization process, a seed polymerization process and a phase inversion emulsification process.

As a typical example, a production process in the case where a non-crosslinkable monomer is used in the synthesis of the first resin, a non-crosslinkable monomer and a crosslinkable monomer are used in the synthesis of the second resin, and a reactive surfactant which becomes the third layer by polymerization is further used is described as an example. A cycloaliphatic-group-containing ethylenically unsaturated monomer and an ionic-group-containing ethylenically unsaturated monomer are included in the non-crosslinkable monomer used in the synthesis of the second resin. In this case, the resin particle is obtained through the following two steps. First, a first step of emulsion-polymerizing a non-crosslinkable monomer to obtain a liquid containing a first resin which is not crosslinked is performed. Then, a second step of adding non-crosslinkable monomers (cycloaliphatic-group-containing ethylenically unsaturated monomer and ionic-group-containing ethylenically unsaturated monomer), a crosslinkable monomer and a reactive surfactant into the liquid obtained in this step to conduct polymerization is performed. In other words, even when the reactive surfactant is added into the reaction system together with the various monomers used in the synthesis of the second layer in the second step to conduct the polymerization at a time, the reactive surfactant is arranged outside the second layer by the action of the hydrophilic site thereof to form the third layer. The first step and the second step are favorably performed in an aqueous liquid medium.

Coloring Material

The ink according to the present invention may also be a clear ink containing no coloring material. However, the ink may also further contain a coloring material. As examples of the coloring material, there are mentioned a pigment and a dye, and any publicly known materials may be used. The pigment is favorably used from the viewpoint of the water resistance of an image recorded. The content (% by mass) of the coloring material in the ink is favorably 0.1% by mass or more to 15.0% by mass or less, more favorably 1.0% by mass or more to 10.0% by mass or less based on the total mass of the ink.

When the pigment is used as the coloring material, no particular limitation is imposed on the kind of the pigment. As specific examples of the pigment, there may be mentioned inorganic pigments such as carbon black; and organic pigments such as azo, phthalocyanine, quinacridone, isoindolinone, imidazolone, diketo-pyrrolo-pyrrole and dioxazine. These may be used either singly or in any combination thereof. As examples of the pigment in terms of the dispersing method thereof, there are mentioned resin-dispersed type pigments using a resin as a dispersant (resin-dispersed pigments using a resin dispersant, microcapsule pigments with the surface of a pigment particle covered with a resin, and resin-bonded pigments with a resin chemically bonded to the surface of a pigment particle). In addition, self-dispersible type pigments (self-dispersible pigments) with a hydrophilic group bonded directly or through another atomic group to the surface of a pigment particle are mentioned. Needless to say, pigments different in dispersing method may also be used in combination.

For the resin-dispersed type pigment, a resin having both hydrophilic site and hydrophobic site is favorably used as a dispersant of the pigment. As specific example thereof, there are mentioned acrylic resins obtained by polymerizing a hydrophilic monomer having a carboxy group, such as (meth)acrylic acid, and a hydrophobic monomer such as styrene or an alkyl (meth)acrylate; and urethane resins obtained by polymerizing a diol having an anionic group, such as dimethylolpropionic acid, and a polyisocyanate. The acid value of the resin used as the dispersant is favorably 50 mg KOH/g or more to 300 mg KOH/g or less. In addition, the weight-average molecular weight (Mw), in terms of polystyrene, of the resin used as the dispersant as determined by GPC is favorably 1,000 or more to 15,000 or less. In addition, the content (% by mass) of the resin used as the dispersant in the ink is favorably 0.1% by mass or more to 10.0% by mass % or less, more favorably 0.2% by mass or more to 4.0% by mass or less based on the total mass of the ink. In addition, the content (% by mass) of the resin used as the dispersant is favorably 0.1-fold or more to 1.0-fold or less in terms of mass ratio with respect to the content (% by mass) of the pigment.

The self-dispersible type pigment is a pigment with an anionic group such as a carboxy group, a sulfonic acid group and a phosphonic acid group bonded directly or through another atomic group (—R—) to the surface of a pigment particle. The anionic group may have any form of an acid form and a salt form. When the anionic group is the salt form, it may be in any state of a partly dissociated state and an entirely dissociated state. As examples of a cation which becomes a counter ion in the case where the anionic group is the salt form, there may be mentioned alkali metal cations; ammonium; and organic ammonium. As examples of the alkali metal cations, there may be mentioned lithium, sodium and potassium. As examples of the organic ammonium, there may be mentioned cations such as alkylamines having 1 to 3 carbon atoms; and alkanolamines having 1 to 4 carbon atoms. In addition, as specific examples of another atomic group (—R—), there may be mentioned linear or branched alkylene groups having 1 to 12 carbon atoms, arylene groups such as a phenylene group and a naphthylene group, an amide group, a sulfonyl group, an amino group, a carbonyl group, an ester group, and an ether group. In addition, at least two groups among these may be combined as a group.

When the dye is used as the coloring material, a dye to which water solubility is imparted by an anionic group such as a sulfonic acid group or a carboxy group is favorably used. As specific examples thereof, there are mentioned acid dyes, direct dyes and reactive dyes which are described in COLOUR INDEX. In addition, even a dye which is not described in COLOUR INDEX may be suitably used so long as it is a dye having an anionic group such as a sulfonic acid group or a carboxy group.

Aqueous Medium

The ink according to the present invention is an aqueous ink containing at least water as an aqueous medium. The ink according to the present invention may further contain a water-soluble organic solvent as an aqueous medium. Deionized water or ion-exchanged water is favorably used as water. The content (% by mass) of water in the ink is favorably 50.0% by mass or more to 95.0% by mass or less based on the total mass of the ink. In addition, the content (% by mass) of the water-soluble organic solvent in the ink is favorably 3.0% by mass or more to 50.0% by mass or less based on the total mass of the ink. Any solvents generally used in an ink may be used as the water-soluble organic solvent. As examples thereof, there are mentioned alcohols, (poly)alkylene glycols, glycol ethers, nitrogen-containing compounds and sulfur-containing compounds. These may be used either singly or in any combination thereof.

Other Additives

The ink according to the present invention may also contain a water-soluble organic compound which is solid at ordinary temperature, such as a polyhydric alcohol such as trimethylolpropane or trimethylolethane, urea, or a urea derivative such as ethyleneurea in addition to the above-described components, as needed. Further, the ink according to the present invention may also contain various additives such as a surfactant, a pH adjustor, a rust preventive, a preservative, a mildewproofing agent, an antioxidant, an anti-reducing agent, an evaporation accelerator, a chelating agent and another resin than the above-described resin particle, as needed.

Physical Properties of Ink

When the ink according to the present invention is applied to an ink jet system, the physical property values thereof are favorably suitably controlled. Specifically, the surface tension of the ink at a temperature of 25° C. as measured by a plate method is favorably 20 mN/m or more to 60 mN/m or less, more favorably 25 mN/m or more to 45 mN/m or less. In addition, the viscosity of the ink at a temperature of 25° C. is favorably 1.0 mPa·s or more to 10.0 mPa·s or less, more favorably 1.0 mPa·s or more to 5.0 mPa·s or less, particularly favorably 1.0 mPa·s or more to 3.0 mPa·s or less. In addition, the pH of the ink at a temperature of 25° C. is favorably 5.0 or more to 10.0 or less. In particular, when the ink according to the present invention is provided as an ink containing a coloring material, the pH of the ink is favorably adjusted to 6.0 or more to 10.0 or less by containing a pH adjustor or the like.

Ink Cartridge:

The ink cartridge according to the present invention has an ink and an ink storage portion storing this ink, and the ink stored in this ink storage portion is the above-described ink according to the present invention. FIG. 1 is a sectional view schematically illustrating an ink cartridge according to an embodiment of the present invention. As illustrated in FIG. 1, an ink supply port 12 for supplying an ink to a recording head is provided in a bottom surface of the ink cartridge. The interior of the ink cartridge is the ink storage portion storing the ink. The ink storage portion is composed of an ink storage chamber 14 and an absorber storage chamber 16, and these chambers communicate with each other through a communication port 18. In addition, the absorber storage chamber 16 communicates with the ink supply port 12. A liquid ink 20 is stored in the ink storage chamber 14, and absorbers 22 and 24 holding the ink in an impregnated state are stored in the absorber storage chamber 16. The ink storage portion may also be configured so as to hold the whole amount of the ink stored by the absorber without providing the ink storage chamber storing the liquid ink. In addition, the ink storage portion may also be configured so as to store the whole amount of the ink in a liquid state without providing the absorber. Further, the ink cartridge may also be configured so as to have an ink storage portion and a recording head.

Ink Jet Recording Method:

The ink jet recording method according to the present invention is a method of ejecting the above-described ink according to the present invention from a recording head of an ink jet system to record an image on a recording medium. As for systems for ejecting the ink, there are mentioned a system in which mechanical energy is applied to the ink and a system in which thermal energy is applied to the ink. In the present invention, the system in which the thermal energy is applied to the ink to eject the ink is particularly favorably used. Steps of the ink jet recording method may be those publicly known except that the ink according to the present invention is used.

"Recording" in the present invention include a mode of conducting recording on a recording medium with the ink according to the present invention and a mode of conducting printing on a liquid-nonabsorbable base material such as glass, plastic or film with the ink according to the present invention. As examples of the recording medium, there are mentioned plain paper and coated paper. The coated paper is that obtained by providing a porous layer composed of an inorganic pigment and a binder on a gas-permeable base material such as paper.

Figure 2A:
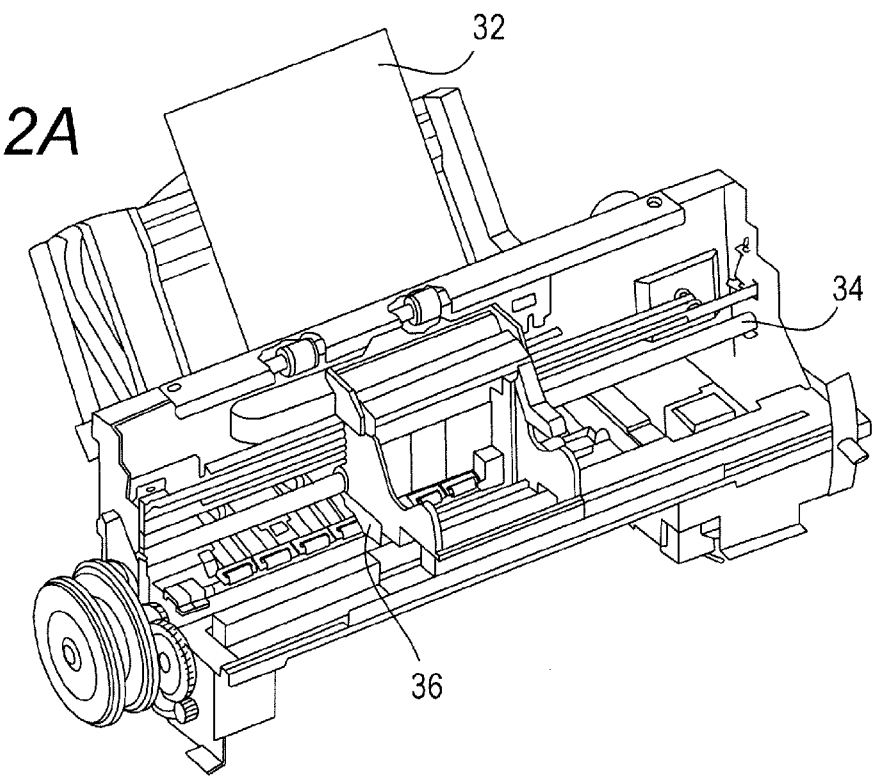
Figure 2B:
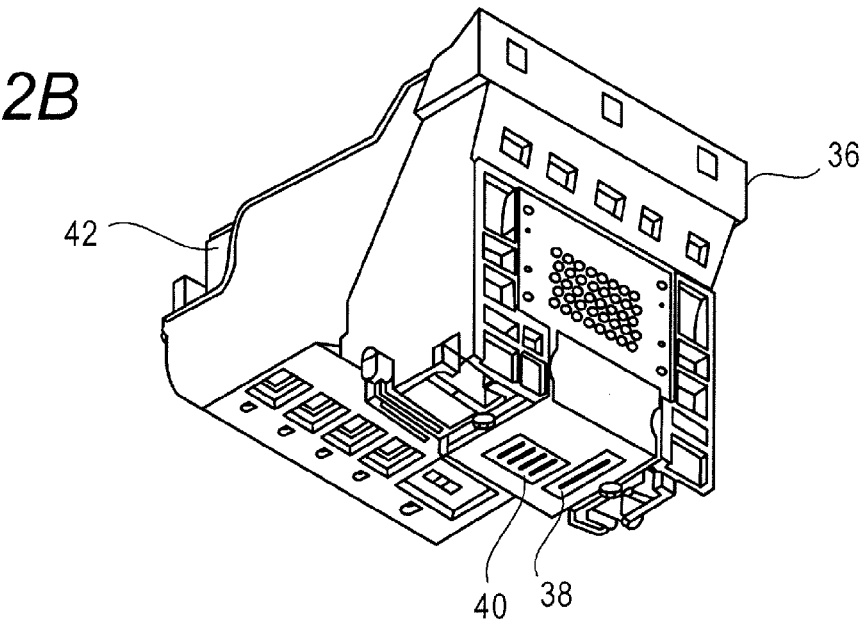

FIGS. 2A and 2B schematically illustrate an exemplary ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be mounted on the carriage shaft 34. The head cartridge 36 is equipped with recording heads 38 and 40 and is configured to set an ink cartridge 42. Inks (not illustrated) are ejected toward the recording medium 32 from the recording heads 38 and 40 while the head cartridge 36 is being carried in a primary scanning direction along the carriage shaft 34. The recording medium 32 is then conveyed in a secondary scanning direction by the conveyance unit (not illustrated), whereby an image is recorded on the recording medium 32.

EXAMPLES

The present invention will hereinafter be described in more detail by Examples and Comparative Examples. However, the present invention is not limited by the following Examples at all unless going beyond the gist thereof. Incidentally, "part(s)" and "%" as to amounts of components are based on mass unless expressly noted.

Preparation of Aqueous Dispersion Liquid Containing Resin Particle:

Aqueous dispersion liquids respectively containing Resin Particles 1 to 36 were prepared according to the following process. The compositions and properties of a first resin forming a first layer and a second resin forming a second layer are shown in Tables 1 to 4. "Specific unit" in Tables 1 and 2 is a unit derived from a monomer containing a carboxy group. In addition, the proportions (%) of various units in Tables 1 to 4 are proportions based on the total mass of the first resin or the second resin. The compositions and properties of Resin Particles 37 and 38 synthesized according to a method described later are collectively shown in Tables 2 and 4.

The THF-insoluble fractions of the first layer and the second layer were measured by respectively synthesizing resins corresponding to the respective layers in the same manner as the following method and utilizing liquids respectively containing the resins thus obtained. However, regarding the resin corresponding to the second layer, a liquid containing a resin was prepared in the same manner as the following method except that an aqueous solution of potassium hydroxide was not added, and the THF-insoluble fraction was measured by using this liquid. Specifically, the measurement of the THF-insoluble fraction was performed according to the following procedure. First, the liquid containing the resin was dried and solidified to take out a solid resin. This resin was added into THF in such a manner that the content of the resin was 0.5% by mass, and stirring was conducted for 24 hours at a temperature of 25° C. Thereafter, a resin which was not dissolved was recovered by filtration, and the resin was dried for 2 hours at a temperature of 80° C. and then weighed to calculate the THF-insoluble fraction (% by mass) according to the equation, [(Mass of the resin not dissolved)/(Mass of the resin added)]×100.

Thirty five parts of monomer(s) of each composition (% by mass) shown in the upper rows of Tables 1 and 2 and 2.0 parts of n-hexadecane (hydrophobe) were mixed and stirred for 30 minutes to obtain a monomer mixture. The resultant monomer mixture was added dropwise into 61.0 parts of a 5.0% aqueous solution of polyoxyethylene cetyl ether (trade name "Nikkol BC15", product of Nikko Chemicals Co., Ltd.), and stirring was conducted for 30 minutes to obtain a mixture. The resultant mixture was emulsified under conditions of 400 W, 20 kHz and 3 hours by means of an ultrasonic irradiation machine (trade name "S-150D Digital Sonifire", manufactured by Branson Co.) to obtain an emulsion. To this emulsion, 0.2 parts of potassium persulfate (polymerization initiator) was added to conduct a polymerization reaction for 4 hours at a temperature of 80° C. under a nitrogen atmosphere, thereby obtaining a liquid containing a first resin. This first resin is a resin corresponding to a first layer of a resin particle.

After 72.0 parts of the first-resin-containing liquid obtained above was heated to a temperature of 75° C. under the nitrogen atmosphere, 0.1 parts of potassium persulfate (polymerization initiator) was added to obtain a mixture containing the first resin. Separately from this, 7.9 parts of ion-exchanged water, 17.0 parts of a monomer mixture of the compositions (% by mass) shown in Tables 3 and 4 and 3.0 parts of a surfactant (reactive or non-reactive) were mixed to obtain an emulsion. The resultant emulsion was added dropwise into the first-resin-containing mixture over 1 hour. A polymerization reaction was then conducted by heating to a temperature of 85° C. and stirring for 2 hours. By this polymerization reaction, the monomers formed a second resin corresponding to a second layer of the resin particle. In addition, the reactive surfactant was bonded to the second layer to become "unit derived from the reactive surfactant", thereby forming a third layer. Thereafter, the reaction mixture was cooled to room temperature, and proper amounts of ion-exchanged water and an aqueous solution of potassium hydroxide were added to obtain an aqueous dispersion liquid containing each resin particle and having a pH of 8.5, the resin particle content of which was 15%.

The each resin particle synthesized in the above-described manner had the following layer structure. Resin Particles 1 to 36 had the first layer formed of the first resin and the second layer formed of the second resin in this order. In addition, Resin Particles 1 to 9, and 11 to 36 had the third layer formed of the unit derived from the reactive surfactant bonded to the second layer outside the second layer. However, Resin Particle 10 did not have the third layer. In addition, regarding the respective resin particles synthesized in the above-described manner, measurements were conducted according to the above-described methods. As a result, they had the following properties. Resin Particles 1 to 28 each had a volume-average particle diameter within a range of 50 to 300 nm, a THF-insoluble fraction within a range of 5 to 80% as the whole of the resin particle, a surface charge quantity within a range of 1 to 50 µmol/m$^2$ and a glass transition temperature within a range of 0 to 200° C.

Resin Particles 37 to 41 were respectively synthesized in the following manner.

Resin Particle 37: A resin particle having a first layer, a second layer and a third layer in this order was synthesized according to Example 9 in Japanese Patent Application Laid-Open No. 2012-201692.

Resin Particle 38: A resin particle having a first layer, a second layer and a third layer in this order was synthesized according to Preparation Process for Resin Particle Dispersion Liquid 1 in Japanese Patent Application Laid-Open No. 2014-101492.

Resin Particle 39: A resin particle having a first layer and a second layer in this order was synthesized according to Preparation Process of Example 3 in Japanese Patent Application Laid-Open No. 2014-208738.

Resin Particle 40: A resin particle having a first layer and a second layer in this order was synthesized according to Preparation Process of Example 13 in Japanese Patent Application Laid-Open No. 2014-208738.

Resin Particle 41: Thirty five parts of a monomer mixture having a composition [54% of n-butyl methacrylate, 7% of ethylene glycol dimethacrylate, 32% of cyclohexyl methacrylate, 7% of methacrylic acid and 3% of polyoxyethylene cetyl ether (trade name "Nikkol BC15", product of Nikko Chemicals Co., Ltd.)] and 2.0 parts of n-hexadecane (hydrophobe) were mixed and stirred for 30 minutes to obtain a monomer mixture. The resultant monomer mixture was added dropwise into 61.0 parts of a 5.0% aqueous solution of polyoxyethylene cetyl ether (trade name "Nikkol BC15", product of Nikko Chemicals Co., Ltd.), and stirring was conducted for 30 minutes to obtain a mixture. The resultant mixture was emulsified under conditions of 400 W, 20 kHz and 3 hours by means of an ultrasonic irradiation machine (trade name "S-150D Digital Sonifire", manufactured by Branson Co.) to obtain an emulsion. To this emulsion, 0.2 parts of potassium persulfate (polymerization initiator) was added to conduct a polymerization reaction for 4 hours at a temperature of 80° C. under a nitrogen atmosphere, and proper amounts of ion-exchanged water and an aqueous solution of potassium hydroxide were added to obtain an aqueous dispersion liquid containing a resin particle of a single layer and having a pH of 8.5, the resin particle content of which was 15%.

TABLE 1

Composition and properties of first layer (first resin)

| | | Number of resin particle | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| Monomer composition (% by mass) | n-Butyl methacrylate | 100 | 50 | 100 | 80 | 60 | 90 | 100 | 100 | 100 | | | | 37 | 44 | | | 35 | 34 | |
| | n-Butyl acrylate | | | | 20 | 40 | | | | | | 100 | 10 | | | 50 | 95 | | | 50 |
| | Ethyl methacrylate | | 50 | | | | | | | | | | 8 | | 52 | 49 | | | | 50 |
| | Methyl acrylate | | | | | | | | | | | | | | | | | | | |
| | Methyl methacrylate | | | | | | | | | | | | 80 | 99 | 60 | | | | 60 | 60 |
| | γ-Methacryloxypropyl-trimethoxysilane | | | | | | | | | | | | | | | | | | | |
| | Ethylene glycol dimethacrylate | | | | | | | | | | | | 2 | 1 | 3 | 4 | | | | |
| | Cyclohexyl methacrylate | | | | | | 10 | | | | | | | | | | | | | |
| | Cyclohexyl acrylate | | | | | | | | | | | | | | | | | 5 | | |

TABLE 1-continued

Composition and properties of first layer (first resin)

| | | Number of resin particle | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| | Isobornyl methacrylate | | | | | | | | | | | | | | | 1 | | | | |
| | α-Methylstyrene | | | | | | | | | | | | | | | | | | | |
| | Methacrylic acid | | | | | | | | | | | | | | | | | | 5 | 6 | |
| Properties | Proportion of crosslinkable unit (%) | 0 | 0 | 0 | 0 | 0 | 0 | 0 | 0 | 0 | 0 | 2 | 1 | 3 | 4 | 0 | 0 | 0 | 0 | 0 |
| | Proportion of cycloaliphatic unit (%) | 0 | 0 | 0 | 0 | 0 | 10 | 0 | 0 | 0 | 0 | 0 | 0 | 0 | 0 | 1 | 5 | 0 | 0 | 0 |
| | Proportion of specific unit (%) | 0 | 0 | 0 | 0 | 0 | 0 | 0 | 0 | 0 | 0 | 0 | 0 | 0 | 0 | 0 | 0 | 5 | 6 | 0 |
| | THF-insoluble fraction (%) | 1 | 1 | 1 | 1 | 1 | 5 | 1 | 1 | 1 | 1 | 15 | 17 | 15 | 17 | 2 | 1 | 10 | 11 | 4 |

TABLE 2

Composition and properties of first layer (first resin)

| | | Number of resin particle | | | | | | | | | |
|---|---|---|---|---|---|---|---|---|---|---|---|
| | | 20 | 21 | 22 | 23 | 24 | 25 | 26 | 27 | 28 | 29 |
| Monomer composition (% by mass) | 2-Ethylhexyl acrylate | | | | | | | | | | |
| | n-Butyl methacrylate | | 70 | 70 | | 100 | 100 | 100 | 100 | 100 | 87 |
| | n-Butyl acrylate | 50 | | | 100 | | | | | | |
| | Ethyl methacrylate | 50 | | | | | | | | | |
| | Methyl acrylate | | | | | | | | | | |
| | Methyl methacrylate | | 30 | 30 | | | | | | | |
| | γ-Methacryloxypropyl-trimethoxysilane | | | | | | | | | | |
| | Vinyltriethoxysilane | | | | | | | | | | |
| | Ethylene glycol dimethacrylate | | | | | | | | | | |
| | Diallyl phthalate | | | | | | | | | | |
| | Cyclohexyl methacrylate | | | | | | | | | | 13 |
| | Cyclohexyl acrylate | | | | | | | | | | |
| | Isobornyl methacrylate | | | | | | | | | | |
| | Styrene | | | | | | | | | | |
| | α-Methylstyrene | | | | | | | | | | |
| | 2-Hydroxyethyl methacrylate | | | | | | | | | | |
| | Methacrylic acid | | | | | | | | | | |
| Properties | Proportion of crosslinkable unit (%) | 0 | 0 | 0 | 0 | 0 | 0 | 0 | 0 | 0 | 0 |
| | Proportion of cycloaliphatic unit (%) | 0 | 0 | 0 | 0 | 0 | 0 | 0 | 0 | 0 | 13 |
| | Proportion of specific unit (%) | 0 | 0 | 0 | 0 | 0 | 0 | 0 | 0 | 0 | 0 |
| | THF-insoluble fraction (%) | 4 | 8 | 8 | 1 | 1 | 1 | 1 | 1 | 1 | 5 |

| | | Number of resin particle | | | | | | | | |
|---|---|---|---|---|---|---|---|---|---|---|
| | | 30 | 31 | 32 | 33 | 34 | 35 | 36 | 37 | 38 |
| Monomer composition (% by mass) | 2-Ethylhexyl acrylate | | | | | | | | 27 | |
| | n-Butyl methacrylate | 100 | 100 | 100 | 100 | 100 | 54 | 100 | | 100 |
| | n-Butyl acrylate | | | | | | | | | |
| | Ethyl methacrylate | | | | | | | | | |
| | Methyl acrylate | | | | | | | | | |
| | Methyl methacrylate | | | | | | | | 36 | |
| | γ-Methacryloxypropyl-trimethoxysilane | | | | | | | | | |
| | Vinyltriethoxysilane | | | | | | | | 6 | |
| | Ethylene glycol dimethacrylate | | | | | 7 | | | | |
| | Diallyl phthalate | | | | | | | | 1 | |
| | Cyclohexyl methacrylate | | | | | | 32 | | | |
| | Cyclohexyl acrylate | | | | | | | | | |
| | Isobornyl methacrylate | | | | | | | | | |

TABLE 2-continued

Composition and properties of first layer (first resin)

|  |  | | | | | | | | | |
|---|---|---|---|---|---|---|---|---|---|---|
|  | Styrene |  |  |  |  |  |  |  | 27 |  |
|  | α-Methylstyrene |  |  |  |  |  |  |  |  |  |
|  | 2-Hydroxyethyl methacrylate |  |  |  |  |  |  |  | 2 |  |
|  | Methacrylic acid |  |  |  |  |  | 7 |  |  |  |
| Properties | Proportion of crosslinkable unit (%) | 0 | 0 | 0 | 0 | 0 | 7 | 0 | 1 | 0 |
|  | Proportion of cycloaliphatic unit (%) | 0 | 0 | 0 | 0 | 0 | 32 | 0 | 0 | 0 |
|  | Proportion of specific unit (%) | 0 | 0 | 0 | 0 | 0 | 7 | 0 | 2 | 0 |
|  | THF-insoluble fraction (%) | 1 | 1 | 1 | 1 | 1 | 19 | 1 | 15 | 1 |

TABLE 3

Composition and properties of second layer (second resin) and third layer

Number of resin particle

|  |  | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Monomer composition (% by mass) | Hexyl methacrylate |  |  |  |  |  |  |  |  |  |  |  |  |  |  |  |  |  |  |  |
|  | n-Butyl methacrylate | 54 |  |  | 22 |  | 52 | 38 | 4 | 57 | 14 |  | 7 | 15 | 15 |  | 42 | 15 | 15 |  |
|  | n-Butyl acrylate |  |  |  |  |  |  |  |  |  |  |  |  |  |  |  |  |  |  |  |
|  | Ethyl methacrylate |  | 32 | 20 | 21 |  |  |  |  |  | 20 | 23 |  |  |  | 10 |  |  |  |  |
|  | Methyl methacrylate |  |  |  |  |  |  |  |  |  |  |  |  |  |  |  |  |  |  | 8 |
|  | Methyl acrylate |  |  |  |  |  |  |  |  |  |  |  |  |  |  |  |  |  |  |  |
|  | γ-Methacryloxypropyl-trimethoxysilane |  |  |  |  |  |  |  |  |  |  |  |  |  |  |  |  |  |  |  |
|  | 1,4-Butanediol dimethacrylate |  |  |  |  | 23 | 12 |  |  | 5 | 20 |  | 10 | 30 | 30 | 35 |  | 30 | 30 |  |
|  | Ethylene glycol dimethacrylate | 7 | 8 | 10 | 12 |  | 28 | 6 |  |  | 28 |  |  |  |  | 20 |  |  |  | 4 |
|  | 1,1,1-Trimethylolpropane triacrylate |  |  |  |  |  |  |  |  |  |  |  |  |  |  |  |  |  |  |  |
|  | Cyclohexyl methacrylate | 32 | 40 | 60 |  | 30 | 24 |  |  |  | 30 |  | 30 | 40 | 40 |  |  | 40 | 40 |  |
|  | Cyclohexyl acrylate |  |  |  |  |  |  | 31 | 20 |  |  | 20 |  |  |  |  | 26 |  |  |  |
|  | Isobornyl methacrylate |  |  |  | 30 | 12 |  |  |  |  | 10 |  | 11 |  |  | 25 |  |  |  |  |
|  | Dicyclopentenyloxyethyl acrylate |  |  |  |  |  |  |  |  | 28 |  | 10 |  |  |  |  |  |  |  | 83 |
|  | Styrene |  |  |  |  |  |  |  |  |  |  |  |  |  |  |  |  |  |  |  |
|  | Benzyl methacrylate |  |  |  |  |  |  |  |  |  |  |  |  |  |  |  |  |  |  |  |
|  | Methacrylic acid | 7 | 20 | 10 |  | 35 | 12 |  |  |  |  |  | 42 | 15 | 15 | 30 |  | 15 | 15 |  |
|  | Acrylic acid |  |  |  | 15 |  |  | 3 | 70 | 10 | 6 | 19 |  |  |  |  | 12 |  |  | 5 |
|  | 2-(Dimethylamino)ethyl methacrylate |  |  |  |  |  |  |  |  |  |  |  |  |  |  |  |  |  |  |  |
|  | Acrylamide |  |  |  |  |  |  |  |  |  |  |  |  |  |  |  |  |  |  |  |
| Surfactant | Aqualon KH-05 | 3 | 3 | 3 | 3 |  | 3 | 3 | 3 | 3 |  | 3 | 3 | 3 | 3 | 3 | 3 | 3 | 3 | 3 |
|  | Aqualon KH-10 |  |  |  |  |  |  |  |  |  |  |  |  |  |  |  |  |  |  |  |
|  | ADEKA REASORP ER-20 |  |  |  |  | 3 |  |  |  |  |  |  |  |  |  |  |  |  |  |  |
|  | Nikkol BC15 |  |  |  |  |  |  |  |  |  | 3 |  |  |  |  |  |  |  |  |  |
| Properties | Proportion of ionic unit (%) | 7 | 20 | 10 | 15 | 35 | 12 | 3 | 70 | 10 | 6 | 19 | 42 | 15 | 15 | 30 | 12 | 15 | 15 | 5 |
|  | Proportion of crosslinkable unit (%) | 7 | 8 | 10 | 12 | 23 | 12 | 28 | 6 | 5 | 20 | 28 | 10 | 30 | 30 | 35 | 20 | 30 | 30 | 4 |
|  | Proportion of cycloaliphatic unit (%) | 32 | 40 | 60 | 30 | 42 | 24 | 31 | 20 | 28 | 40 | 30 | 41 | 40 | 40 | 25 | 26 | 40 | 40 | 83 |
|  | THF-insoluble fraction (%) | 19 | 25 | 46 | 38 | 52 | 40 | 66 | 17 | 15 | 58 | 72 | 19 | 70 | 70 | 78 | 66 | 70 | 70 | 16 |

TABLE 4

Composition and properties of second layer (second resin) and third layer

| | | Number of resin particle | | | | | | | | | | | | | | | | | |
|---|---|---|---|---|---|---|---|---|---|---|---|---|---|---|---|---|---|---|---|
| | | 20 | 21 | 22 | 23 | 24 | 25 | 26 | 27 | 28 | 29 | 30 | 31 | 32 | 33 | 34 | 35 | 36 | 37 | 38 |
| Monomer composition (% by mass) | 2-Ethylhexy acrylate | | | | | | | | | | | | | | | | | | 11 | |
| | Hexyl methacrylate | | | | | | | | | | | | | 32 | | | | | | | |
| | n-Butyl methacrylate | | | | 14 | | | | | | 52 | | | 54 | 39 | | | 100 | 55 | | 62 |
| | n-Butyl acrylate | | | | | | 2 | 1 | | | | | | | | | 70 | | | | |
| | Ethyl methacrylate | | 12 | 7 | 20 | 46 | 41 | | | 12 | | 54 | | | | | | | | | |
| | Methyl methacrylate | 7 | | | | | | | | | | | | | | | | | | | |
| | Methyl acrylate | | | | | | | | | | | | | | | | | | | | |
| | γ-Methacryloxypropyl-trimethoxysilane | | | | | | | | | | | | | | | | | | | | |
| | Vinyltriethoxysilane | | | | | | | | | | | | | | | | | | | 7 | |
| | 1,4-Butanediol dimethacrylate | | | | | 15 | 15 | | | 30 | 12 | 24 | | | | 3 | | | | | 19 |
| | Ethylene glycol dimetharylate | 5 | 50 | 55 | | | | 5 | 5 | | | | 7 | 28 | 5 | | | 6 | | | |
| | Diallyl phthalate | | | | | | | | | | | | | | | | | | | 3 | |
| | 1,1,1-Trimethylolpropane triacrylate | | | | 20 | | | | | | | | | | | | | | | | |
| | Cyclohexyl methacrylate | | | | | | | | | 46 | 24 | | | 31 | 20 | | | | 22 | | |
| | Cyclohexyl acrylate | | | | 30 | 15 | 20 | 90 | 91 | | | | | | | 22 | | | | | |
| | Isobornyl methacrylate | | 30 | 30 | | | | | | | | | | | | | | | | | |
| | Dicyclopentenyloxyethyl acrylate | 83 | | | 10 | | | | | | | | | | | | | | | | |
| | Styrene | | | | | | | | | | | | | | | | | | 32 | 34 | |
| | α-Methylstyrene | | | | | | | | | | | | | | | | | | | 22 | |
| | Benzyl methacrylate | | | | | | | | | | | | | | | | | | | | |
| | Sodium styrenesulfonate | | | | | | | | | | | | | | | | | | | 1 | |
| | Methacrylic acid | | | | | 24 | 24 | | | | 12 | | 7 | | | | | | 7 | | 19 |
| | Acrylic acid | 5 | 8 | 8 | 6 | | | 3 | 3 | | | 22 | | 2 | 75 | 5 | | | | | |
| | 2-(Dimethylamino)ethyl methacrylate | | | | | | | | | 12 | | | | | | | | | | | |
| | Acrylamide | | | | | | | | | | | | | | | | | | | | |
| Surfactant | Aqualon KH-05 | 3 | 3 | 3 | 3 | 3 | 3 | 3 | 3 | 3 | 3 | 3 | 3 | 3 | 3 | 3 | 3 | 3 | | | 3 |
| | Aqualon KH-10 | | | | | | | | | | | | | | | | | | | 3 | |
| | ADEKA REASORP ER-20 | | | | | | | | | | | | | | | | | | | | |
| | Nikkol BC15 | | | | | | | | | | | | | | | | | | | | |
| Properties | Proportion of ionic unit (%) | 5 | 8 | 8 | 6 | 24 | 24 | 3 | 3 | 12 | 12 | 22 | 7 | 2 | 75 | 5 | 0 | 7 | 1 | 19 |
| | Proportion of crosslinkable unit (%) | 5 | 50 | 55 | 20 | 15 | 15 | 5 | 5 | 30 | 12 | 24 | 7 | 28 | 5 | 3 | 0 | 6 | 3 | 19 |
| | Proportion of cycloaliphatic unit (%) | 83 | 30 | 30 | 40 | 15 | 20 | 90 | 91 | 46 | 24 | 0 | 0 | 31 | 20 | 22 | 0 | 0 | 22 | 0 |
| | THF-insoluble fraction (%) | 19 | 93 | 99 | 75 | 52 | 55 | 18 | 18 | 68 | 41 | 74 | 19 | 66 | 18 | 7 | 1 | 21 | 16 | 58 |

The details of the surfactants shown by the trade names in Tables 3 and 4 are as follows:

Aqualon KH-05 and Aqualon KH-10: reactive surfactants, products of DSK Co., Ltd.;

ADEKA REASOAP ER-20: reactive surfactant, product of ADEKA CORPORATION; and

Nikkol BC15: non-reactive surfactant, product of Nikko Chemicals Co., Ltd.

In Tables 1 to 4, styrene, α-methylstyrene and benzyl methacrylate correspond to the aromatic-group-containing ethylenically unsaturated monomers. In addition, methacrylic acid, acrylic acid and 2-(dimethylamino)ethyl methacrylate correspond to the ionic-group-containing ethylenically unsaturated monomers, and methacrylic acid and acrylic acid correspond to the carboxy-group-containing monomers. 1,4-Butanediol dimethacrylate, ethylene glycol dimethacrylate and 1,1,1-trimethylolpropane triacrylate correspond to the crosslinkable monomers. In addition, cyclohexyl methacrylate, cyclohexyl acrylate, isobornyl methacrylate and dicyclopentenyloxyethyl acrylate correspond to the cycloaliphatic-group-containing ethylenically unsaturated monomers.

Preparation of Pigment Dispersion Liquid:

A styrene-ethyl acrylate-acrylic acid terpolymer having an acid value of 150 mg KOH/g and a weight-average molecular weight of 8,000 was neutralized with a 10% aqueous solution of potassium hydroxide to obtain an aqueous resin solution having a resin content of 20.0%. Then, 30.0 parts of the aqueous resin solution, 20.0 parts of a pigment (carbon black, trade name "Monarch 1100, product of Cabot Co.) and 50.0 parts of ion-exchanged water were mixed. This mixture was dispersed for 5 hours by means of a batch type vertical sand mill (manufactured by IMEX Co.) filled with 200 parts of zirconia beads having a particle diameter of 0.3 mm. Thereafter, a centrifugal separation treatment was conducted to remove coarse particles, and filtration was conducted under pressure through a microfilter (product of Fuji Photo Film Co., Ltd.) having a pore size of 3.0 μm. A pigment dispersion liquid (pigment content: 20.0%; resin content: 6.0%) in a state where the pigment was dispersed in water by the resin dispersant was obtained by the above-described process.

Preparation of Ink:

After respective components shown below were mixed and sufficiently stirred, the resultant mixtures were filtered under pressure through a microfilter (product of Fuji Photo Film Co., Ltd.) having a pore size of 3.0 μm to prepare respective inks. As a nonionic surfactant, trade name "Acetylenol E100" (product of Kawaken Fine Chemicals Co., Ltd.) was used.

Aqueous dispersion liquid of resin particle (kind shown in Table 1 to 4): 70.0%

Pigment dispersion liquid: 10.0%

Glycerol: 10.0%

Diethylene glycol: 4.0%

Nonionic surfactant: 1.0%

Ion-exchanged water: 5.0%.

Evaluation:

Each of the inks obtained above was filled into an ink cartridge, and the ink cartridge was set in an ink jet recording apparatus (trade name "PIXUS Pro 9500", manufactured by Canon Inc.) in which a recording head from which an ink is ejected by thermal energy was installed. In the above ink jet recording apparatus, an image recorded under the conditions in which resolution is 600 dpi×600 dpi, and eight ink droplets each of which is 3.5 ng are applied to a unit region of 1/600 in.×1/600 in. is defined as the recording duty being 100%. In the present invention, in the evaluation criteria of the following respective evaluation items, "A" and "B" were taken as acceptable levels, and "C" was taken as an unacceptable level. The Evaluated results are shown in Table 5.

Fixability

A solid image (200 mm×200 mm) whose recording duty was 100% was recorded on a recording medium (trade name "OK Top Coat", basis weight: 127.9 g, product of Oji Paper Co., Ltd.) to obtain a recorded article. Ten seconds after the recording, a Silbon paper sheet was pressed against the portion of the solid image. The condition of the ink having adhered to the Silbon paper sheet by transfer was visually observed to evaluate the fixability according to the following evaluation criterion:

A: The ink did not adhere to the Silbon paper sheet;

B: The ink adhered to the Silbon paper sheet to the form of points with a 1 mm or less diameter;

C: The ink adhered to the Silbon paper sheet in the form of points with a more than 1 mm diameter or in the form of lines.

Abrasion Resistance

A solid image (200 mm×200 mm) whose recording duty is 100% was recorded on a recording medium (trade name "OK Top Coat", basis weight: 127.9 g, product of Oji Paper Co., Ltd.) to obtain a recorded article. One hour after the recording, a rubbing test was conducted under the conditions of 500 g load and 30 strokes on the portion of the solid image by means of an abrasion resistance tester (manufactured by Imoto Machinery Co., Ltd.) which is a JSPS-type testing machine conforming to JIS L 0849. Thereafter, whether scratch marks in the solid image and the white background of the recording medium were recognized or not was visually observed to evaluate the abrasion resistance according to the following evaluation criterion:

A: The scratch marks were not observed in the solid image;

B: The scratch marks were slightly observed in the solid image, but the white background of the recording medium was not recognized;

C: the scratch marks were observed in the solid image, and the white background of the recording medium was also recognized.

TABLE 5

Evaluation conditions and evaluated results

| | | Number of resin particle | Fixability | Abrasion resistance |
|---|---|---|---|---|
| Example | 1 | 1 | A | A |
| | 2 | 2 | A | A |
| | 3 | 3 | A | A |
| | 4 | 4 | A | A |
| | 5 | 5 | A | A |
| | 6 | 6 | B | B |
| | 7 | 7 | A | A |
| | 8 | 8 | A | A |
| | 9 | 9 | A | A |
| | 10 | 10 | B | B |
| | 11 | 11 | A | A |
| | 12 | 12 | A | B |
| | 13 | 13 | A | A |
| | 14 | 14 | A | B |
| | 15 | 15 | A | A |
| | 16 | 16 | B | B |
| | 17 | 17 | A | A |
| | 18 | 18 | A | B |
| | 19 | 19 | B | B |
| | 20 | 20 | A | A |
| | 21 | 21 | A | A |
| | 22 | 22 | B | B |
| | 23 | 23 | B | B |
| | 24 | 24 | B | B |
| | 25 | 25 | A | A |
| | 26 | 26 | A | A |
| | 27 | 27 | B | B |
| | 28 | 28 | B | B |
| Comparative Example | 1 | 29 | C | C |
| | 2 | 30 | C | C |
| | 3 | 31 | C | C |
| | 4 | 32 | C | C |
| | 5 | 33 | C | C |
| | 6 | 34 | C | C |
| | 7 | 35 | C | C |
| | 8 | 37 | C | C |
| | 9 | 38 | C | C |
| | 10 | 39 | C | C |
| | 11 | 40 | C | C |
| | 12 | 41 | C | C |
| Referential Example | 1 | 36 | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-099647, filed May 18, 2016, which is hereby incorporated by reference herein in its entirety.

What is claimed is:

1. An aqueous ink for ink jet comprising a resin particle, wherein the resin particle has a first layer and a second layer in this order from the inside toward the outside of the resin particle,
wherein the first layer is formed of a first resin in which a proportion of a unit derived from a cycloaliphatic-group-containing ethylenically unsaturated monomer is 10% by mass or less, and
wherein (i) a tetrahydrofuran-insoluble fraction of the second layer is 15% by mass or more, (ii) the second layer is formed of a second resin having the unit derived from the cycloaliphatic-group-containing ethylenically unsaturated monomer and a unit derived from an ionic-group-containing ethylenically unsaturated monomer, and (iii) a proportion of the unit derived from the ionic-group-containing ethylenically unsaturated monomer in the second resin is 3% by mass or more to 70% by mass or less.

2. The aqueous ink according to claim 1, wherein the resin particle further has a third layer formed of a unit derived from a reactive surfactant bonded to the second layer.

3. The aqueous ink according to claim 1, wherein a tetrahydrofuran-insoluble fraction of the first layer is 15% by mass or less.

4. The aqueous ink according to claim 1, wherein a proportion of a unit derived from a crosslinkable monomer in the first resin is 3% by mass or less.

5. The aqueous ink according to claim 1, wherein a proportion of the unit derived from the cycloaliphatic-group-containing ethylenically unsaturated monomer in the first resin is 1% by mass or less.

6. The aqueous ink according to claim 1, wherein a proportion of a unit derived from a monomer containing at least one functional group selected from the group consisting of a carboxy group, an alcoholic hydroxy group and a silanolic hydroxy group in the first resin is 5% by mass or less.

7. The aqueous ink according to claim 1, wherein a tetrahydrofuran-insoluble fraction of the second layer is 95% by mass or less.

8. The aqueous ink according to claim 1, wherein the second resin has a unit derived from a crosslinkable monomer, and a proportion of the unit derived from the crosslinkable monomer in the second resin is 5% by mass or more to 50% by mass or less.

9. The aqueous ink according to claim 8, wherein the crosslinkable monomer in the second resin has two ethylenically unsaturated bonds.

10. The aqueous ink according to claim 1, wherein a proportion of the unit derived from the cycloaliphatic-group-containing ethylenically unsaturated monomer in the second resin is 20% by mass or more to 90% by mass or less.

11. The aqueous ink according to claim 1, wherein an ionic group of the ionic-group-containing ethylenically unsaturated monomer in the second layer is a carboxy group.

12. An ink cartridge comprising an ink and an ink storage portion storing the ink,
wherein the ink is the aqueous ink according to claim 1.

13. An ink jet recording method comprising ejecting an ink from an ink jet recording head to record an image on a recording medium,
wherein the ink is the aqueous ink according to claim 1.

* * * * *